US 12,446,007 B2

(12) United States Patent
Kucera et al.

(10) Patent No.: US 12,446,007 B2
(45) Date of Patent: Oct. 14, 2025

(54) SIDELINK TRANSMISSIONS

(71) Applicant: Nokia Technologies Oy, Espoo (FI)

(72) Inventors: Stepan Kucera, Munich (DE); Daniel Medina, Munich (DE); Berthold Panzner, Holzkirchen (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 372 days.

(21) Appl. No.: 17/955,990

(22) Filed: Sep. 29, 2022

(65) Prior Publication Data
US 2023/0121083 A1 Apr. 20, 2023

(30) Foreign Application Priority Data
Oct. 14, 2021 (EP) .................................. 21202739

(51) Int. Cl.
H04W 72/02 (2009.01)
H04W 72/0446 (2023.01)
H04W 72/52 (2023.01)

(52) U.S. Cl.
CPC ....... *H04W 72/02* (2013.01); *H04W 72/0446* (2013.01); *H04W 72/52* (2023.01)

(58) Field of Classification Search
CPC . H04W 72/02; H04W 72/0446; H04W 72/52; H04W 72/40; H04W 72/541; H04W 72/25; H04W 76/14
See application file for complete search history.

(56) References Cited

U.S. PATENT DOCUMENTS

| 2019/0373618 | A1 | 12/2019 | Medina et al. |
| 2020/0068609 | A1 | 2/2020 | Wang et al. |
| 2020/0344721 | A1 | 10/2020 | Xing et al. |
| 2021/0160849 | A1 | 5/2021 | Sun et al. |
| 2021/0168790 | A1 | 6/2021 | Li et al. |
| 2022/0353870 | A1* | 11/2022 | Dutta .................... H04W 72/54 |
| 2024/0205943 | A1* | 6/2024 | Ye ......................... H04W 72/40 |
| 2024/0292378 | A1* | 8/2024 | Khoryaev ............. H04W 72/40 |

FOREIGN PATENT DOCUMENTS

| CN | 103703850 A | 4/2014 |
| CN | 104349479 A | 2/2015 |
| CN | 105191466 A | 12/2015 |

(Continued)

OTHER PUBLICATIONS

3GPP Discussion on Mode 2 enhancements TR37.885; Publication date: Aug. 17-28, 2020; Publication: https:/www.3gpp.org/ftp/tsg_ran/WG1_RL1/TSGR1_102-e/Docs/R1-2005645.zip.

(Continued)

*Primary Examiner* — Chae S Lee
(74) *Attorney, Agent, or Firm* — Lippes Mathias LLP

(57) ABSTRACT

An apparatus, method and computer program is described comprising: sending a request from a transmitting user device to a second user device for communication resource recommendations based on a resource setting, wherein the communication resource recommendations include preferred and/or non-preferred communications resources for sidelink transmissions from the transmitting user device to a receiving user device. The resource setting is adjusted based on conditions as detected at the transmitting user device.

17 Claims, 7 Drawing Sheets

(56) References Cited

FOREIGN PATENT DOCUMENTS

| CN | 109526255 A | 3/2019 |
|---|---|---|
| CN | 112889336 A | 6/2021 |
| WO | WO 2021/167838 A1 | 2/2021 |

OTHER PUBLICATIONS

3GPP Inter-UE coordination in mode-2 Publication date: Aug. 17-28, 2020; Publication: https:/www.3gpp.org/ftp/tsg_ran/WG1_RL1/TSGR1_102-e/Docs/R1-2005961.zip.
Xiaomi: "Discussion on inter-UE coordination", 3GPP Draft; R1-2109385, vol. RAN WG1, No. e-Meeting; Sep. 30, 2021 (Sep. 30, 2021), XP052058331.
Nokia et al: "Inter-UE coordination for Mode 2 enhancements", 3GPP Draft; R1-2108819, vol. RAN WG1, No. e-Meeting; Oct. 2, 2021 (Oct. 2, 2021), XP052057887.
Catt et al: "Discussion on inter-UE coordination in sidelink mode 2", 3GPP Draft; R1-2106943, vol. RAN WG1, No. e-Meeting; Aug. 7, 2021 (Aug. 7, 2021), XP052038116.
Apple: "On Inter-UE Coordination", 3GPP Draft; R1-2110054, vol. RAN WG1, No. e-Meeting; Oct. 2, 2021 (Oct. 2, 2021), XP052058990.
LG Electronics, "Feature Lead Summary for AI 8.11.1.2 Inter-UE Coordination for Mode 2 Enhancements", R1-2108569, 3GPP TSG RAN WG1 Meeting #106-e, Aug. 16-27, 2021, 257 pgs.
Intel Corporation, "Solutions for Sidelink Communication with Inter-UE Coordination Feedback", R1-2109632 3GPP TSG RAN 2G1 #106-bis-e, e-Meeting, Oct. 11-19, 2021, 48 pgs.

* cited by examiner

SIDELINK TRANSMISSIONS

FIELD

Embodiments as set out in this patent application relate to sidelink transmissions, for example to sidelink transmissions in 5G New Radio (NR) communication systems.

BACKGROUND

Direct communications between two user devices of a communication system is known, for example, as part of Long Term Evolution (LTE) or New Radio (NR) devices and may be achieved using so-called LTE/NR sidelinks (referred to as "sidelinks" herein). There remains a need for further developments in this field.

SUMMARY

In a first aspect, this specification describes an apparatus comprising means for performing: sending a request from a transmitting user device to a second user device for communication resource recommendations based on a resource setting (e.g. a number of communication resources and/or a size of said communication resources), wherein the communication resource recommendations include preferred and/or non-preferred communications resources for sidelink transmissions from the transmitting user device to a receiving user device, wherein the resource setting is adjusted, based on conditions as detected at the transmitting user device. Said adjustments may comprise increasing or reducing resources setting (e.g. increasing or reducing resource size or number of resource requirements). In some example embodiments, the apparatus is the transmitting user device.

Some example embodiments further comprise means for performing: receiving the requested communication resource recommendations at the transmitting user device in accordance with the resource setting, wherein the communication resource recommendations are based on conditions as detected at the second user device (e.g. what resources are available (as far as the second user device is aware)). Thus, the recommendations may be based on local conditions (at the second user device/receiving device), but in accordance with the resource setting.

Some example embodiments further comprise means for performing: determining whether to adjust said resource setting (based on conditions as detected at the transmitting user device) and adjusting said resource setting accordingly. The means for performing determining whether to adjust said resource setting may comprise means for performing: determining a probability that at least a defined number or percentage of said communication resource recommendations are not excluded by the transmitting user device and adjusting said resource setting based on the determined probability.

In some example embodiments, the means for performing determining whether to adjust said resource setting comprises means for performing: determining a user device communication congestion metric; and adjusting the resource setting based on said communication congestion metric. For example, the resource setting may be increased if said communication congestion metric is above a threshold and/or decreased if the communication congestion metric is below second threshold. The first and second thresholds may be the same in some example embodiments, but may be different in other example embodiments. The said communication congestion metric may be based, at least in part, on a channel busy ratio of said transmitting user device and/or the second user device. The said communication congestion metric may be based, at least in part, of a degree of overlap between preferred resources of the second user device and non-preferred resources of the transmitting user device. For example, small resource sizes may be allowed if there is a high degree of overlap.

Some example embodiments further comprise means for performing: selecting communication resources for transmissions from said transmitting user device to said receiving user device based, at least in part, on the communication resource recommendations received from said second user device. The communication resources for transmissions may also be selected based on knowledge at the transmitting user device.

In some example embodiments, the communications resources for sidelink transmissions from the transmitting user device to a receiving user device are defined by one or more of: time slot(s) for transmissions; starting subchannels; resource size (e.g. length of contiguously allocated subchannels); and modulation and coding schemes.

In some example embodiments, the second device is the receiving device. However, this is not essential to all example embodiments. For example, the second device may be a neighbour of the receiving device.

In a second aspect, this specification describes a system comprising a transmitting user device and a second user device. The transmitting user device of the system comprises means for performing: sending a request to the second user device for communication resource recommendations based on a resource setting, wherein the communication resource recommendations include preferred and/or non-preferred communications resources for sidelink transmissions from the transmitting user device to a receiving user device, wherein the resource setting is adjusted, based on conditions as detected at the transmitting user device. The second user device of the system comprises means for performing: receiving the request from the transmitting user device for communication resource recommendations based on said resource setting; generating the requested communication resource recommendations in accordance with the resource setting, based on conditions as detected at the receiving user device; and sending the generated requested communication resource recommendations to the transmitting user device. The request sent by the transmitting user device to the second user device for communication resource recommendations may indicate some communication resource requirements (e.g. number of resources and/or size of resources). In some example embodiments, the second device is the receiving device. However, this is not essential to all example embodiments. For example, the second device may be a neighbour of the receiving device.

The transmitting user device of the second aspect may further comprise one or more features of the apparatus of the first aspect.

In the first and second aspects, the said means may comprise: at least one processor; and at least one memory including computer program code, the at least one memory and computer program code configured to, with the at least one processor, cause the performance of the apparatus.

In a third aspect, this specification describes a method comprising: sending a request from a transmitting user device to a second user device for communication resource recommendations based on a resource setting (e.g. a number of communication resources and/or a size of said communication resources), wherein the communication resource recommendations include preferred and/or non-preferred communications resources for sidelink transmissions from the transmitting user device to a receiving user device, wherein the resource setting is adjusted, based on conditions as detected at the transmitting user device. Adjustment may comprise increasing or reducing the resource setting (e.g. increasing/reducing resource size or number of resource requirements).

Some example embodiments further comprise: receiving the requested communication resource recommendations at the transmitting user device in accordance with the resource setting, wherein the communication resource recommendations are based on conditions as detected at the second user device.

Some example embodiments further comprise: determining whether to adjust said resource setting, based on conditions as detected at the transmitting user device and adjusting said resource setting accordingly. Determining whether to adjust said resource setting may comprise: determining a probability that at least a defined number or percentage of said communication resource recommendations are not excluded by the transmitting user device and adjusting said resource setting based on the determined probability.

Determining whether to adjust said resource setting may comprise: determining a user device communication congestion metric; and adjusting the resource setting based on said communication congestion metric. The said communication congestion metric may be based, at least in part, on a channel busy ratio of said transmitting user device and/or the second user device. The said communication congestion metric may be based, at least in part, of a degree of overlap between preferred resources of the second user device and non-preferred resources of the transmitting user device. For example, small resource sizes may be allowed if there is a high degree of overlap.

Some example embodiments further comprise: selecting communication resources for transmissions from said transmitting user device to said receiving user device based, at least in part, on the communication resource recommendations received from said second user device. The communication resources for transmissions may also be selected based on knowledge at the transmitting user device.

In some example embodiments, the communications resources for sidelink transmissions from the transmitting user device to a receiving user device are defined by one or more of: time slot(s) for transmissions; starting subchannels; resource size (e.g. length of contiguously allocated subchannels); and modulation and coding schemes.

In a fourth aspect, this specification describes a method comprising: sending a request from a transmitting user device to a second user device for communication resource recommendations based on a resource setting, wherein the communication resource recommendations include preferred and/or non-preferred communications resources for sidelink transmissions from the transmitting user device to a receiving user device; receiving the request (at the second user device) from the transmitting user device for so communication resource recommendations based on said resource setting; generating the requested communication resource recommendations (at the second user device) in accordance with the resource setting, based on conditions as detected at the receiving user device; and sending the generated requested communication resource recommendations from the second user device to the transmitting user device. The said resource setting may be adjusted (e.g. at the transmitting user device), based on conditions as detected at the transmitting user device. The second device may be the receiving device or a neighbour of the receiving device.

The method of the fourth aspect may further comprise one or more features of the method of the third aspect.

In a fifth aspect, this specification describes an apparatus configured to perform (at least) any method as described with reference to the third or fourth aspects.

In a sixth aspect, this specification describes computer-readable instructions which, when executed by a computing apparatus, cause the computing apparatus to perform (at least) any method as described with reference to the third or fourth aspects.

In a seventh aspect, this specification describes a computer-readable medium (such as a non-transitory computer-readable medium) comprising program instructions stored thereon for performing (at least) any method as described with reference to the third or fourth aspects.

In an eighth aspect, this specification describes an apparatus comprising: at least one processor; and at least one memory including computer program code which, when executed by the at least one processor, causes the apparatus to perform (at least) any method as described with reference to the third or fourth aspects.

In a ninth aspect, this specification describes a computer program comprising instructions for causing an apparatus to perform at least the following: sending a request from a transmitting user device to a second user device for communication resource recommendations based on a resource setting, wherein the communication resource recommendations include preferred and/or non-preferred communications resources for sidelink transmissions from the transmitting user device to a receiving so user device, wherein the resource setting is adjusted, based on conditions as detected at the transmitting user device.

In a tenth aspect, this specification describes an apparatus comprising: a processor (or some other means) for sending a request from a transmitting user device to a second user device for communication resource recommendations based on a resource setting, wherein the communication resource recommendations include preferred and/or non-preferred communications resources for sidelink transmissions from the transmitting user device to a receiving user device, wherein the resource setting is adjusted (e.g. by said processor), based on conditions as detected at the transmitting user device.

In an eleventh aspect, this specification describes an apparatus comprising: at least one processor; and at least one memory including computer program code, the at least one memory and computer program code configured to, with the at least one processor, cause the apparatus to: send a request from a transmitting user device to a second user device for communication resource recommendations based on a resource setting, wherein the communication resource recommendations include preferred and/or non-preferred communications resources for sidelink transmissions from the transmitting user device to a receiving user device, wherein the resource setting is adjusted, based on conditions as detected at the transmitting user device. Adjustment may be increasing/reducing resources setting (e.g. increasing/reducing resource size or number of resource requirements).

Some example embodiments further comprise: receiving the requested communication resource recommendations at the transmitting user device in accordance with the resource setting, wherein the communication resource recommendations are based on conditions as detected at the second user device.

Some example embodiments further comprise: determining whether to adjust said resource setting, based on conditions as detected at the transmitting user device and adjusting said resource setting accordingly. Determining whether to adjust said resource setting may comprise: determining a probability that at least a defined number or percentage of said communication resource recommendations are not excluded by the transmitting user device and adjusting said resource setting based on the determined probability.

Determining whether to adjust said resource setting may comprise: determining a user device communication congestion metric; and adjusting the resource setting based on said communication congestion metric. The said communication congestion metric may be based, at least in part, on a channel busy ratio of said transmitting user device and/or the second user device. The said communication congestion metric may be based, at least in part, of a degree of overlap between preferred resources of the second user device and non-preferred resources of the transmitting user device. For example, small resource sizes may be allowed if there is a high degree of overlap.

Some example embodiments further comprise: selecting communication resources for transmissions from said transmitting user device to said receiving user device based, at least in part, on the communication resource recommendations received from said second user device. The communication resources for transmissions may also be selected based on knowledge at the transmitting user device.

In some example embodiments, the communications resources for sidelink transmissions from the transmitting user device to a receiving user device are defined by one or more of: time slot(s) for transmissions; starting subchannels; resource size (e.g. length of contiguously allocated subchannels); and modulation and coding schemes.

BRIEF DESCRIPTION OF DRAWINGS

Example embodiments will now be described, by way of non-limiting examples, with reference to the following schematic drawings, in which.

DETAILED DESCRIPTION

Figure 1:
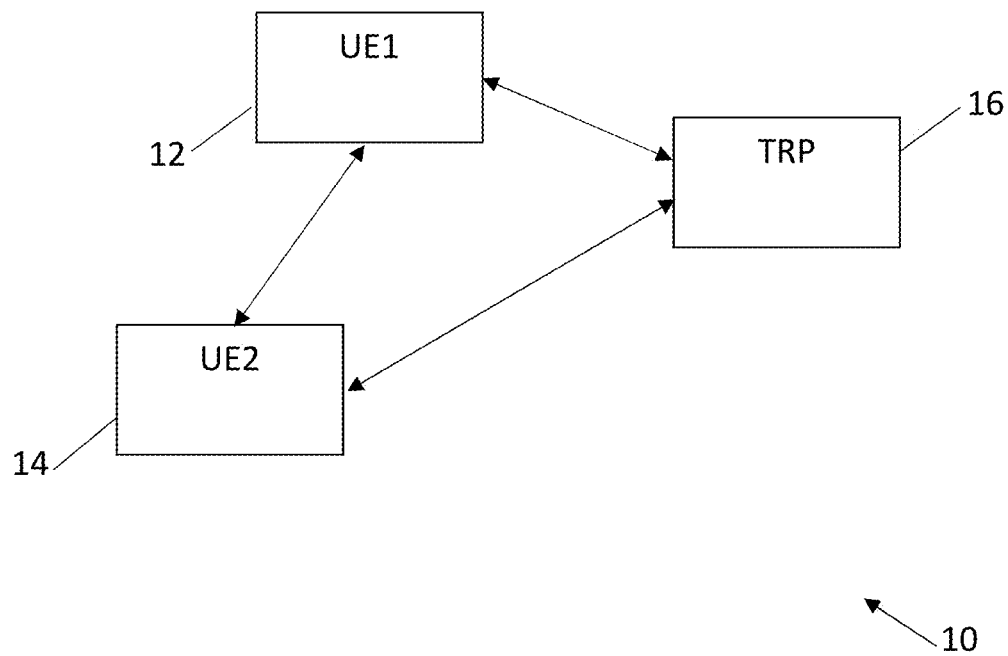
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Direct communications between two user devices (UEs) of a mobile communication system is known, for example, as part of Long Term Evolution (LTE) or New Radio (NR) devices and may be achieved using so-called LTE/NR sidelinks (referred to as "sidelinks" herein). Adaption of the core LTE/NR standard permits this direct communication between nearby LTE/NR devices via sidelinks without the need of going through a base station.

Sidelink communications may be useful, for example, for communications between vehicles (e.g. vehicle-to-everything (V2X) use cases), since many vehicles are using sidelink functionality already. Sidelink communications are useful in many other applications.

By way of example, FIG. 1 is a block diagram of a mobile communication system, indicated generally by the reference numeral 10, in accordance with an example embodiment. The system 10 comprises a first user device 12, a second user device 14 and a transmission-reception point (TRP) 16. The TRP 16 may be a gNB or base station so of a mobile communication system. The first and second user devices are both in two-way communication with the TRP 16. In addition, the first and second user devices are able to communicate directly with one another using sidelinks (or some other direct link).

Figure 2:
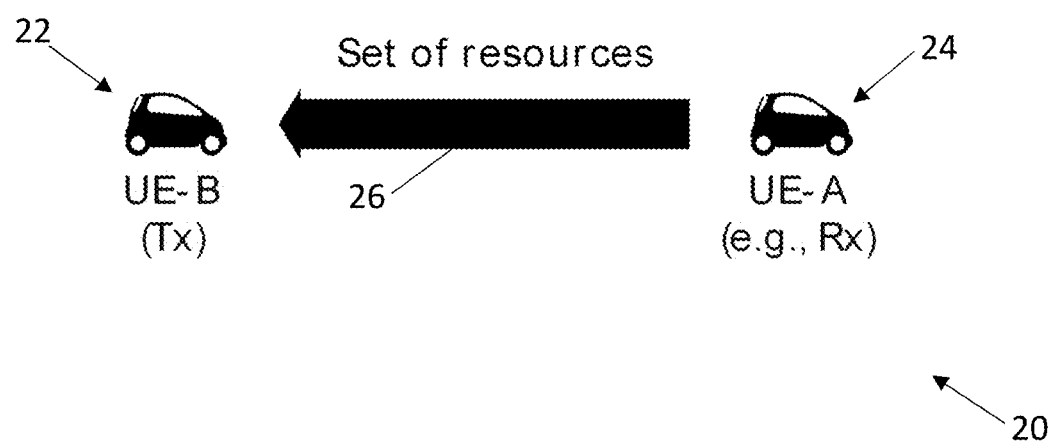
FIG. 2 is a block diagram of a system in accordance with an example embodiment.

FIG. 2 is a block diagram of a system, indicated generally by the reference numeral 20, in accordance with an example embodiment. The system 20 comprises a first (transmitting) user device 22 in the form of a vehicle and a second (receiving) user device 24, also in the form of a vehicle. The user devices 22 and 24 may be the user devices 12 and 14 of the system 10 described above.

The first user device 22 intends to transmit to the second user device 24 using a sidelink transmission. In order to enable effective communications, the second user device 24 may indicate a set of resources 26 that may be used by the first user device 22 for transmissions to the second user device 24. As discussed in detail below, the resources may include, for example, time and/or frequency transmission slots, although other resources may be relevant in addition to, or instead of, those slots.

The resources 26 may be provided as part of inter-UE co-ordination information in which preferred and/or non-preferred resources for use in sidelink transmissions from the first user device 22 to the second user device 24 are defined by the second user device. As discussed further below, the transmission of such co-ordination information may be triggered by the first user device 22 (e.g. by means of a coordination request).

Figure 3:
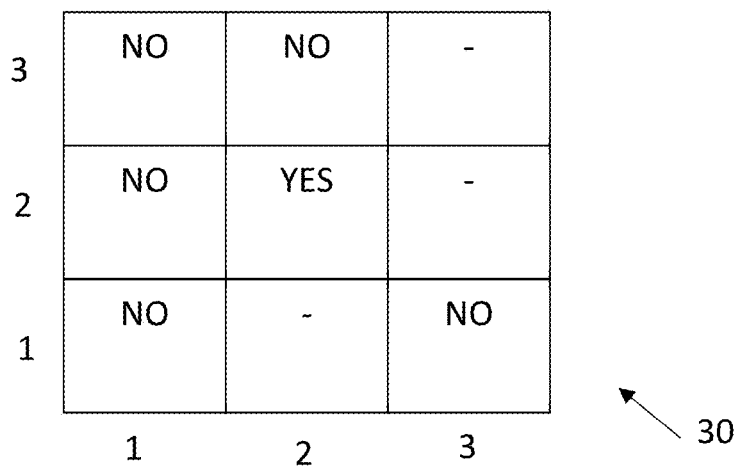
FIGS. 3 and 4 are block diagrams showing example resource allocations.

FIG. 3 is a block diagram, indicated generally by the reference numeral 30, showing an example resource allocation. Specifically, the resource allocation 30 shows time and frequency slots allocated by the second user device 24 that may be provided to the first user device 22 as the resources 26 described above.

In the resource allocation 30, time slots are shown on the horizontal axis and frequency slots are shown on the vertical axis. The resource allocation 30 shows that none of the frequency slots of time slot 1 are available (they are "not preferred"). In time slot 2, the availability of the first frequency slot is undefined, the second frequency slot is available (a "preferred" slot) and the third frequency slot is unavailable. In time slot 3, the first frequency slot is unavailable and the availability of the second and third frequency slots are undefined.

As indicated above, the resource allocation 30 may be sent from the second user device 24 to the first user device 22 as the set of resources 26. Accordingly, the first user device 22 may seek to send sidelink transmissions to the second user device 24 using the preferred resource indicated by the resource allocation 30.

Figure 4:
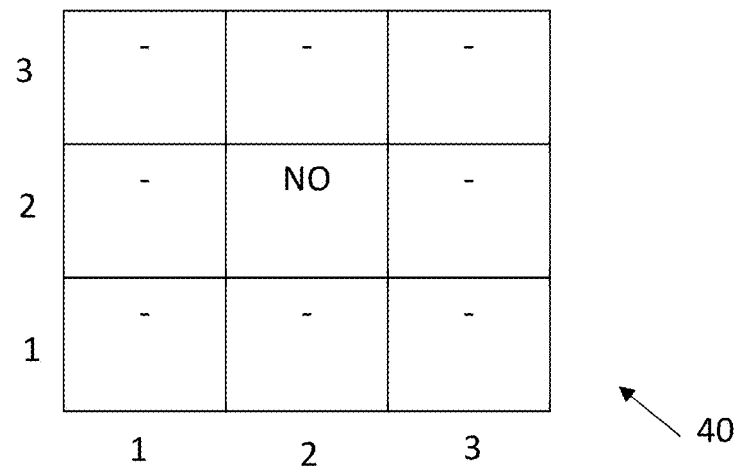

FIG. 4 is a block diagram, indicated generally by the reference numeral 40, showing an example resource allocation in accordance with an example embodiment. Specifically, the resource allocation 40 shows time and frequency slots of the first user device 22 that are available for transmissions to the second user device 24.

In the resource allocation 40, all of the time and frequency slots are undefined with the exception of the second frequency slot of time slot 2, which is unavailable (or "not preferred").

From a combination of the resource allocations 30 and 40, it can be seen that the only resource that the second user device 24 indicates is available for communications (in the resource allocation 30) has been identified by the first user device 22 (in the resource allocation 40) as being unavailable. As a result, an inter-UE coordination failure may occur. Such failures may occur when a receiving user device fails to recommend resources to a transmitting user device that are acceptable not only for the receiving user device in terms of its own interference conditions but are also acceptable to the transmitting user device.

Inter-UE co-ordination failures can arise where a receiving user device recommends preferred transmission resources to a transmitting user device based solely on local sensing at the receiving user device. This can occur since a transmission by the transmitting user device may cause undesirable interference or collisions to other user devices on the transmitting user device side, of which receiving user device (the second user device 24 in the example described above) is not aware. This is sometimes referred to as a "hidden node" problem.

In the example described above, the transmitting user device 22 conducts its own sensing and identifies its own preferred and non-preferred transmission resources, reflecting the transmitter user device's own interference conditions. As a result, none of so receiving user devices preferred resources are selected for transmission by the transmitting user device.#

Figure 5:
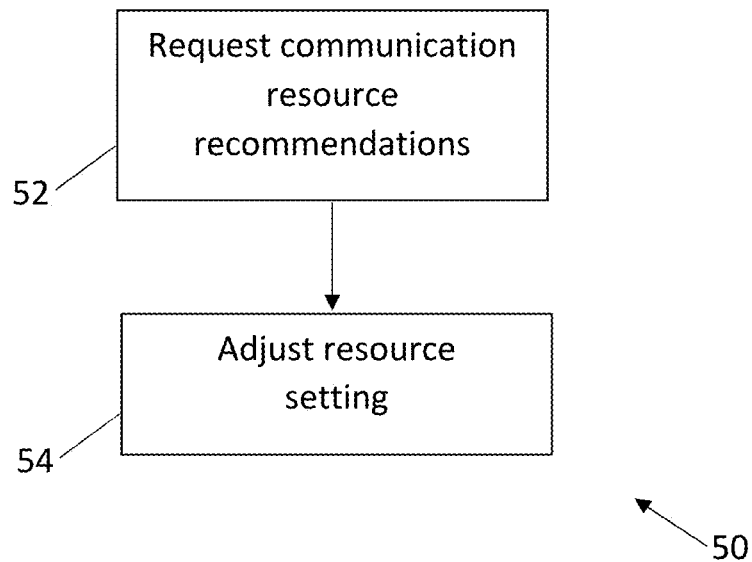
FIG. 5 is a flow chart showing a method or algorithm in accordance with an example embodiment.

FIG. 5 is a flow chart showing a method or algorithm, indicated generally by the reference numeral 50, in accordance with an example embodiment.

The method or algorithm 50 starts at operation 52, where a request is sent from a transmitting user device (such as the first user device 22) to a second user device for communication resource recommendations based on a resource setting. In one example, the resource setting identifies a number of communication resources and/or a size of said communication resources, as discussed in detail below.

The communication resource recommendations requested by the transmitting user device include preferred or non-preferred communications resources for sidelink transmissions from the transmitting user device to a receiving user device. In some example embodiments, the communication resource recommendation may include both preferred and non-preferred communications resources, as discussed above.

At operation 54, the resource setting may be adjusted, based on conditions as detected at the transmitting user device (e.g. the first user device 22). Example resource settings and their possible adjustment are discussed in detail below.

Figure 6:
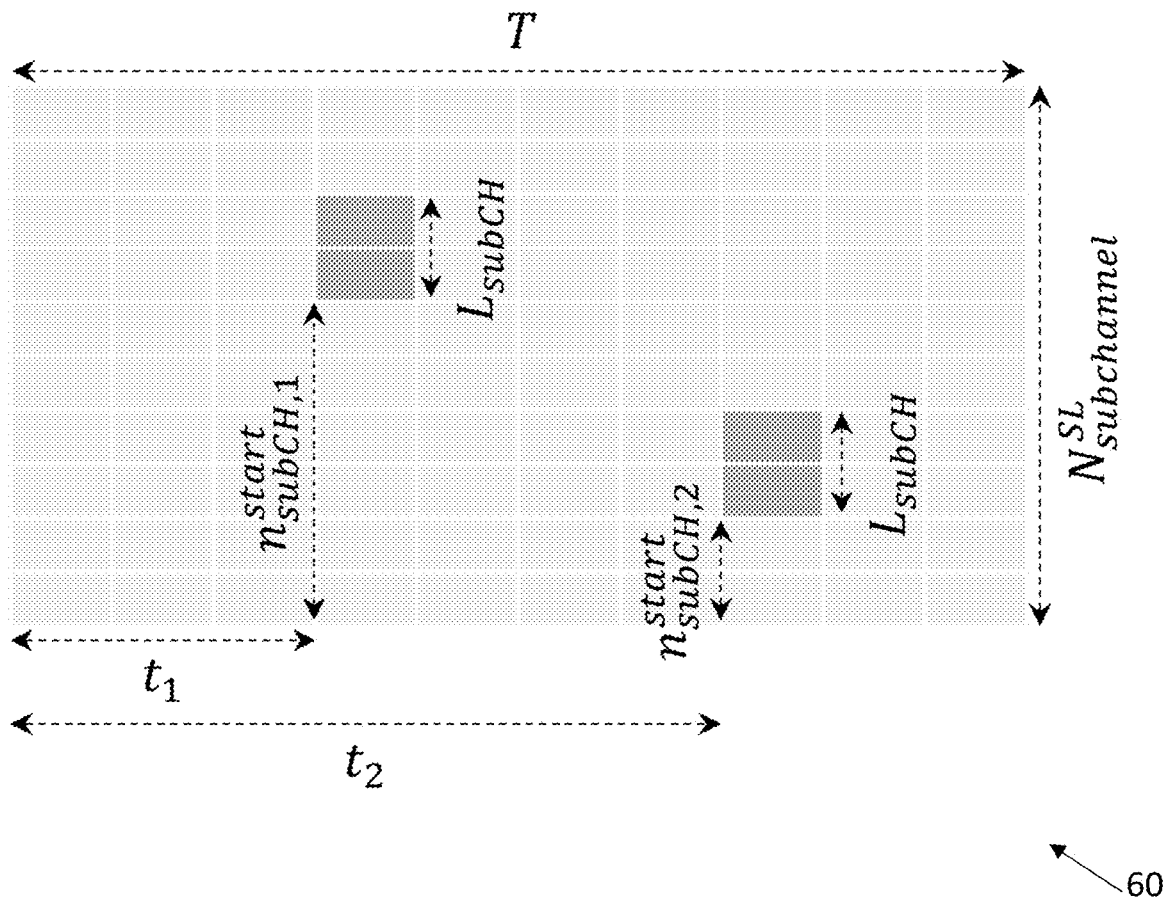
FIG. 6 is a block diagram showing a resource allocation in accordance with an example embodiment.

FIG. 6 is a block diagram, indicated generally by the reference numeral 60, showing a resource allocation in accordance with an example embodiment. The resources are selected within a selection window of T (logical) slots and pool of $N_{subchannel}^{SL}$ subchannels.

Resources may be allocated based, for example, on one or more of:
- resource set cardinality k (i.e., a number of preferred resources);
- time slots $t_1, \ldots, t_k$;
- starting subchannels $n_{subCH,1}^{start}, \ldots, n_{subCH,k}^{start}$;
- resource size (e.g., length of contiguously allocated subchannels) $L_{subCH}$.

Other resources may be allocated in alternative embodiments. Such resource may include modulation coding schemes and/or coding rates.

In the specific example shown in the resource allocation 60, two preferred resources are shown (such that k=2). The first resource is provided in slot $t_1$ having a starting subchannel $n_{subCH,1}^{start}$ and a resource size ($L_{subCH}$) of 2. The second resource is provided in slot $t_2$ having a starting subchannel $n_{subCH,2}^{start}$ and a resource size ($L_{subCH}$) of 2.

In the algorithm 50 described above, the operation 52 requests communication resource recommendation based on a resource setting (which resource setting may be included as a parameter of the request). That resource setting may define a number of communication resources and a size of said communication resources. The resource allocation 60 would meet the requirement of a resource setting requesting that two communication resources be provided, each having a resource size of two units.

As discussed further below, in some cases, the resource size $L_{subCH}$ may be indicated by a transmitting user device in a coordination request to a receiving user device (e.g. in an example implementation of the operation 52 described above). In other cases, the resource size may be determined by the receiving user device. Similarly, in some cases, the resource set cardinality k may be indicated by the transmitting user device in a coordination request to a receiving user device. In other cases, the resource set cardinality may be determined by the receiving user device.

Figure 7:
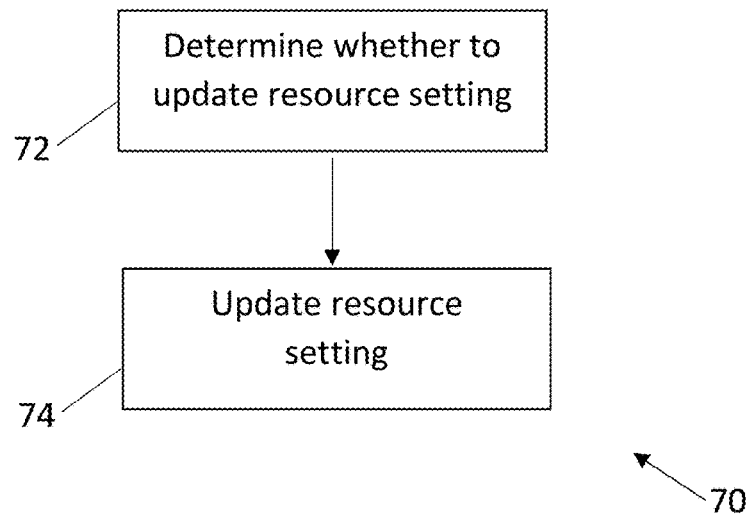
FIG. 7 is a flow chart showing a method or algorithm in accordance with an example embodiment.

FIG. 7 is a flow chart showing a method or algorithm, indicated generally by the reference numeral 70, in accordance with an example embodiment. The algorithm 70 is an example implementation of the operation 54 of the algorithm 50 described above.

The algorithm 70 starts at operation 72 where a determination is made regarding whether the resource settings should be updated or adjusted (for example by increasing or reducing the resource settings). The operation 72 may be based on conditions at the transmitting user device (such as the first user device 22), as discussed further below.

At operation 74, the resource setting is updated, if it was determined in the operation 72 that the setting should be updated. For example, the resource setting may be updated by increasing or reducing the resource size and/or the number of resources required. By way of example, the operation 72 may include determining a user device communication congestion metric and the operation 74 may include adjusting the resource setting based on said communication congestion metric (e.g. by increasing the so resource setting if said communication congestion metric is above a first threshold and decreasing the resource setting if said communication congestion metric is below a second threshold).

The resource setting may be updated to select (either at a transmitting user device or at a receiving user device) the resource set cardinality k and/or the resource size $L_{subCH}$, such that a pre-defined probability of the first user device accepting at least a defined number (m) of resource recommendations (m≤k) or a defined percentage of resource recommendations from the second user device is achieved. Note that the defined number may be 100%, such that the resource setting may be updated such that a pre-defined probability of all resource recommendations being accepted is achieved. For example, the operation 72 may comprise determining a probability that at least a defined number or percentage of said communication resource recommendations are not excluded by the transmitting user device and the operation 74 may comprising adjusting said resource setting based on the determined probability.

For example, a transmitting user device (such as the first user device 22 described above) may request a larger preferred resource set (i.e., resource set cardinality k) from a receiving user device (such as the second user device 24) if the channel is more congested at the transmitting user device (e.g., as expressed in terms of transmitting user devices Channel Busy Ratio, CBR). The transmitting user device may request a smaller preferred resource set from a receiving user device if the channel is less congested at the transmitting user device.

Alternatively, or in addition, a transmitting user device may request a larger resource size $L_{subCH}$ if the channel is less congested at transmitting user device and may request a smaller resource size if the channel is more congested.

A user device may also dynamically adapt the resource set cardinality k and/or the resource size $L_{subCH}$, e.g., based on the percentage of a receiving user device's preferred resources that do not overlap with a transmitting user devices non-preferred resources (defined, for example, as resources excluded based on the transmitting user device's sensing procedure, as specified, for example, in 3GPP TS 38.214 Section 8.1.4), or based on the resource size $L_{subCH}$ of the receiving user device's preferred resources, if resource size is determined by a receiving user device. For example, larger recommended resources may be more likely to overlap with the transmitting user so device's non-preferred resources.

Such adaptation may be performed either by the transmitting user device or the receiving user device.

If the transmitting user device does not specify a number of resources to be recommended by the receiving user device, the resource set cardinality k may be adapted by the receiving user device. For example, if the transmitting user device does not use any of the receiving user device's recommended resources, the receiving user device may double k in a subsequent recommendation. Conversely, if the transmitting user device uses one of the receiving user device's recommended resources, the receiving user device may decrease k (e.g., linearly) in a subsequent recommendation.

In terms of 3GPP standard relevant signaling, three schemes are discussed further below, depending on what parameters the transmitting user device adaptively controls and signals to the receiving user device: "k only", "$L_{subCH}$ only", "both k and $L_{subCH}$".

In a first example embodiment, the transmitting user device (such as the first user device 22) controls k. In this example embodiment, the transmitting user device, upon receiving coordination information from the receiving user device, evaluates the percentage of the receiving user device's preferred resources that overlap with non-preferred resources on the transmitting user device's side (e.g. resources excluded based on the transmitting user device's sensing procedure, as specified, for example, in 3GPP TS 38.214 Section 8.1.4). The resource set cardinality k to be requested from the receiving user device (e.g., in a future coordination request) may be increased if the percentage exceeds a given threshold.

Alternatively, k may be adapted dynamically such that there is a constant probability that the transmitting user device accepts at least m resources from the k resources recommended by the receiving user device (i.e., m≤k).

In another example, k may be adapted based on a measured channel busy ratio (CBR) of the transmitting user device and/or the receiving user device. The higher the channel occupancy, the higher k is chosen. Similarly, k may be adapted depending on whether the receiving user device's preferred resources are sufficient to deliver a pre-defined amount of data (which may be signaled explicitly to the receiving user device).

Another example comprises varying k depending on the overlap of the transmitting user device's preferred or non-preferred resources with the resources recommended by the receiving user device. A higher k may be chosen, for example, when there is little agreement and/or overlap between the transmitting and receiving user devices, to increase the chance of mutually beneficial resource selection.

In a second example embodiment, the transmitting user device controls k and $L_{subCH}$. Thus, in addition to adapting the resource set cardinality k, the transmitting user device may adapt the resource size $L_{subCH}$ (or range of resource sizes) to be considered by the receiving user device when determining the preferred resource set. For example, if the percentage of the receiving user device's preferred resources that overlap with the transmitting user device's non-preferred resources is above a threshold, the transmitting user device may indicate a smaller resource size $L_{subCH}$ in a subsequent coordination request. In this way, the transmitting user device may increase the probability that the receiving user device's recommended resources are also preferred from the transmitting user device's perspective in the future.

In a third example embodiment, the transmitting user device controls $L_{subCH}$. For example, to simplify the above procedure, the transmitting used device can fix k (e.g. temporarily) and only vary $L_{subCH}$.

Figure 8:
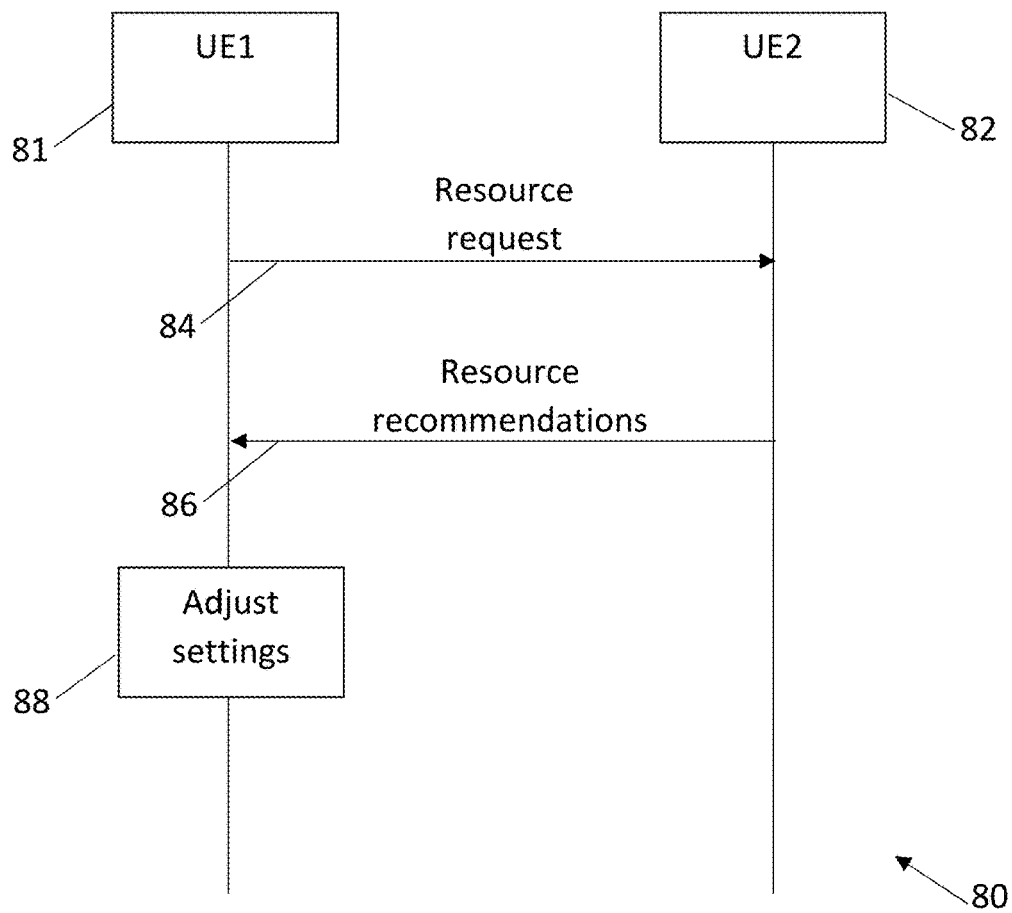
FIG. 8 shows a message sequence in accordance with an example embodiment.

FIG. 8 shows a message sequence, indicated generally by the reference numeral 80, in accordance with an example embodiment. The message sequence 80 shows messages between a first user device 81 (such as the first user device 22 described above) and a second user device 82 (such as the second user device 24 described above). The first user device 81 is seeking to send sidelink transmissions to a receiving user device. Note that whilst the second user device 82 may be the receiving user device, this is not essential to all example embodiments, as discussed further below.

The message sequence 80 starts with a resource request 84 being sent from the first (transmitting) user device 81 to the second user device 82 for communication resource recommendations based on a resource setting. As discussed above, communication resource recommendations include preferred and/or non-preferred communications so resources for sidelink transmissions from the first user device 81 to the receiving user device.

In response to the request 84, the requested communication resource recommendations 86 are sent from the second user device 82 to the first user device 81. The communication resource recommendations 86 are in accordance with the resource setting and are based on conditions as detected at the second user device. For example, the resource recommendations may be based on what resources are available at the receiving user device (as far as the second user device 82 is aware). Thus, the resource recommendations are based on local conditions (at the second user device), but in accordance with the resource setting.

At operation 88 of the message sequence 80, the resource setting may be adjusted, based on conditions as detected at the first user device 81. The operation 88 may be carried out in response to the receipt of the resource recommendations 86 (as shown in the message sequence 80), but this is not essential to all example embodiments; the operation 88 may therefore be implemented at other times and/or in response to other triggers.

Figure 9:
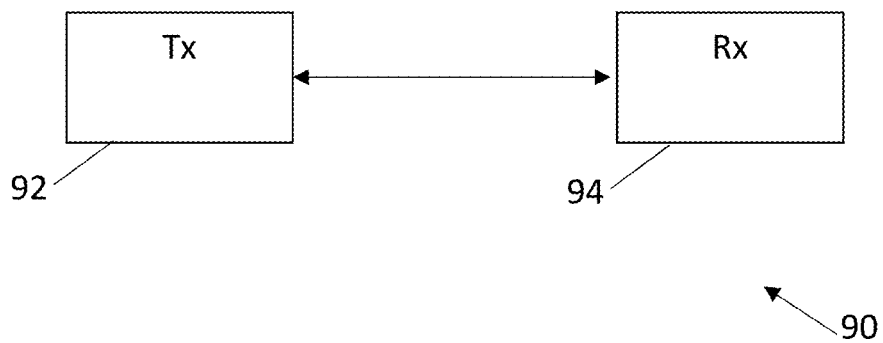
FIGS. 9 and 10 are block diagrams showing systems in accordance with example so embodiments.

FIG. 9 is a block diagram of a system, indicated generally by the reference numeral 90, in accordance with an example embodiment. The system 90 may be used to implement the message sequence 80 described above. The system comprises a transmitting user device 92 and a receiving user device 94, which may be used to implement the first user device 81 and the second user device 82 of the message sequence 80 described above.

Figure 10:
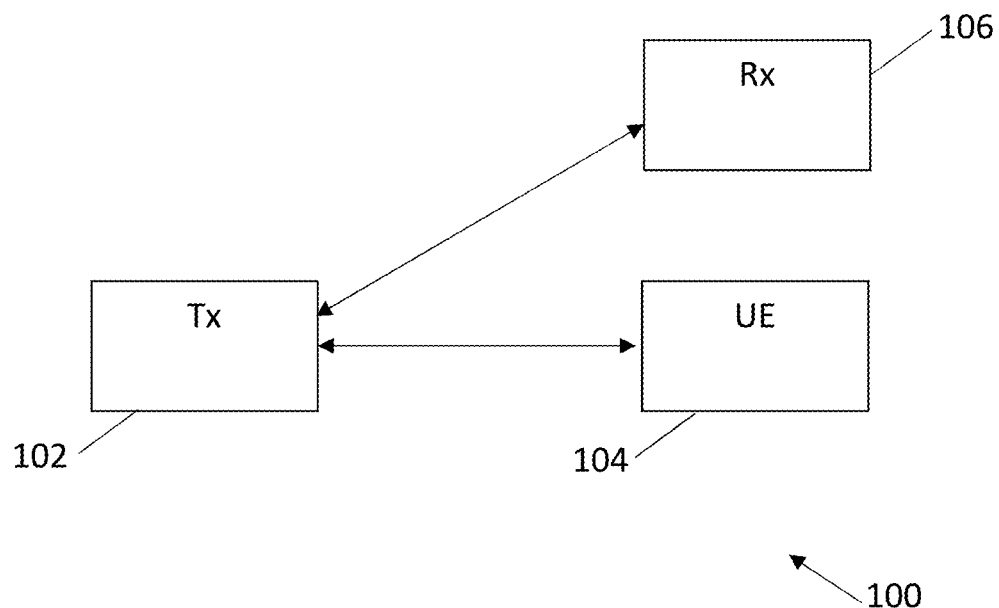

FIG. 10 is a block diagram of a system, indicated generally by the reference numeral 100, in accordance with an example embodiment. The system 100 may be used to implement the message sequence 80 described above. The system 100 comprises a transmitting user device 102, a second user device 104 and a receiving user device 106. The transmitting user device 102 and the second user device 104 may be used to implement the first user device 81 and the second user device 82 of the message sequence 80 described above. Sidelink transmissions may take place between the transmitting user device 102 and the receiving user device 106 based on resource recommendations provided by the second user device 104.

In the system 100, the second user device 104 may be a neighbour of the receiving user device 106. Such an arrangement may be useful if the receiving user device 106 is not active at the time at which the resource recommendations are requested. An active user device that is a neighbour of the receiving user device may have better information regarding the local conditions that the receiving user device 106.

Figure 11:
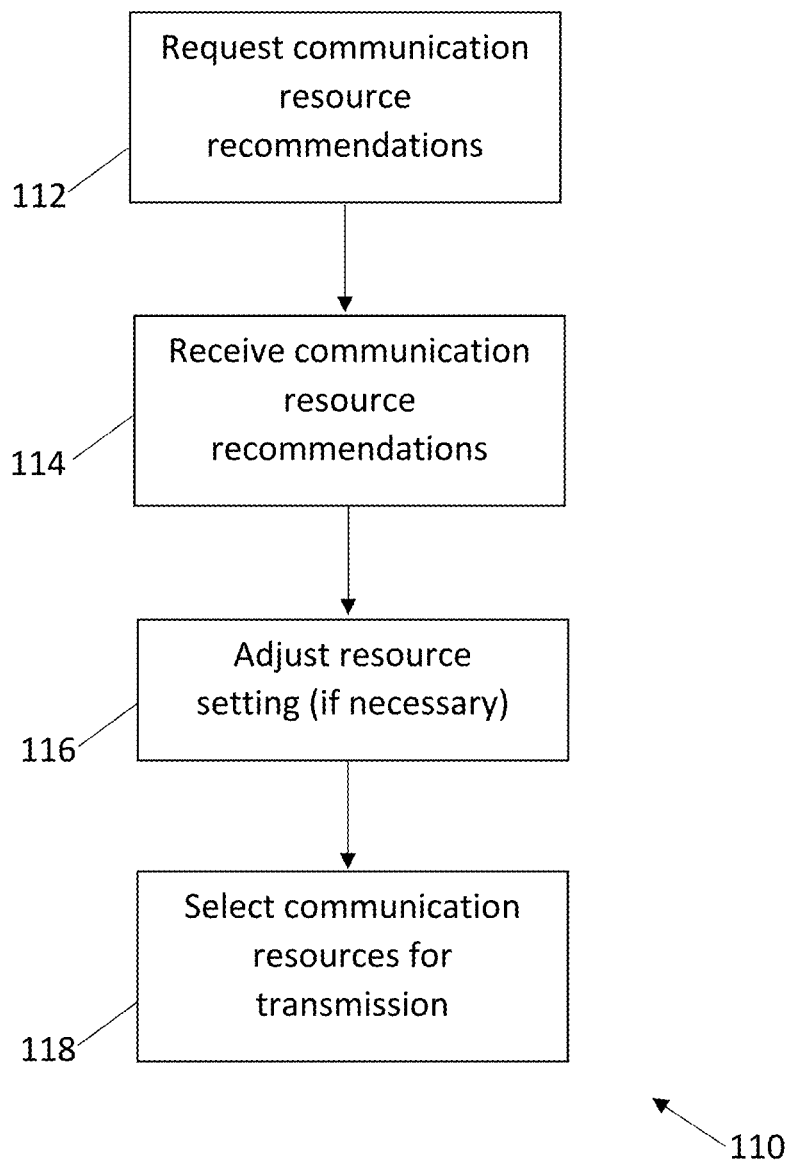
FIG. 11 is a flow chart showing a method or algorithm in accordance with an example embodiment.

FIG. 11 is a flow chart showing a method or algorithm, indicated generally by the reference numeral 110, in accordance with an example embodiment.

The method or algorithm 110 starts at operation 112, where communication resource recommendations for sidelink transmissions are requested by a transmitting user device (such as one of the user devices 22, 81, 92 or 102 described above). The operation 112 may be implemented using the message 84 of the message sequence 80 described above.

At operation 114 of the method or algorithm 110, the requested communication resource recommendations are received at the transmitting user device. As discussed above, the resource recommendations may be provided by the receiving user device (such as the user device 94) or by some other user device (such as the user device 104).

The operation 114 are may be implemented using the message 86 of the message sequence 80 described above.

As discussed above, the communications resources for sidelink transmissions from the transmitting user device to the receiving user device may be defined by one or more of: a number of resources; time slot(s) for transmissions; frequency slot(s) for transmissions; starting subchannels; resource size; modulation and coding schemes; and coding rates. The skilled person will be aware of other communication resources that could be relevant.

At operation 116 of the method or algorithm 110, the resource setting may be adjusted, based on conditions as detected at the first (transmitting) user device. The operation 116 may be implemented following receipt of the communication resource recommendation but, as discussed above, this is not essential to all example embodiments.

At operation 118 of the method or algorithm 110, communication resources for transmissions from the transmitting user device to the receiving user device are selected based, at least in part, on the communication resource recommendations received from said second user device in the operation 114. The communication resources may also be set based on knowledge of conditions at the transmitting user device.

Figure 12:
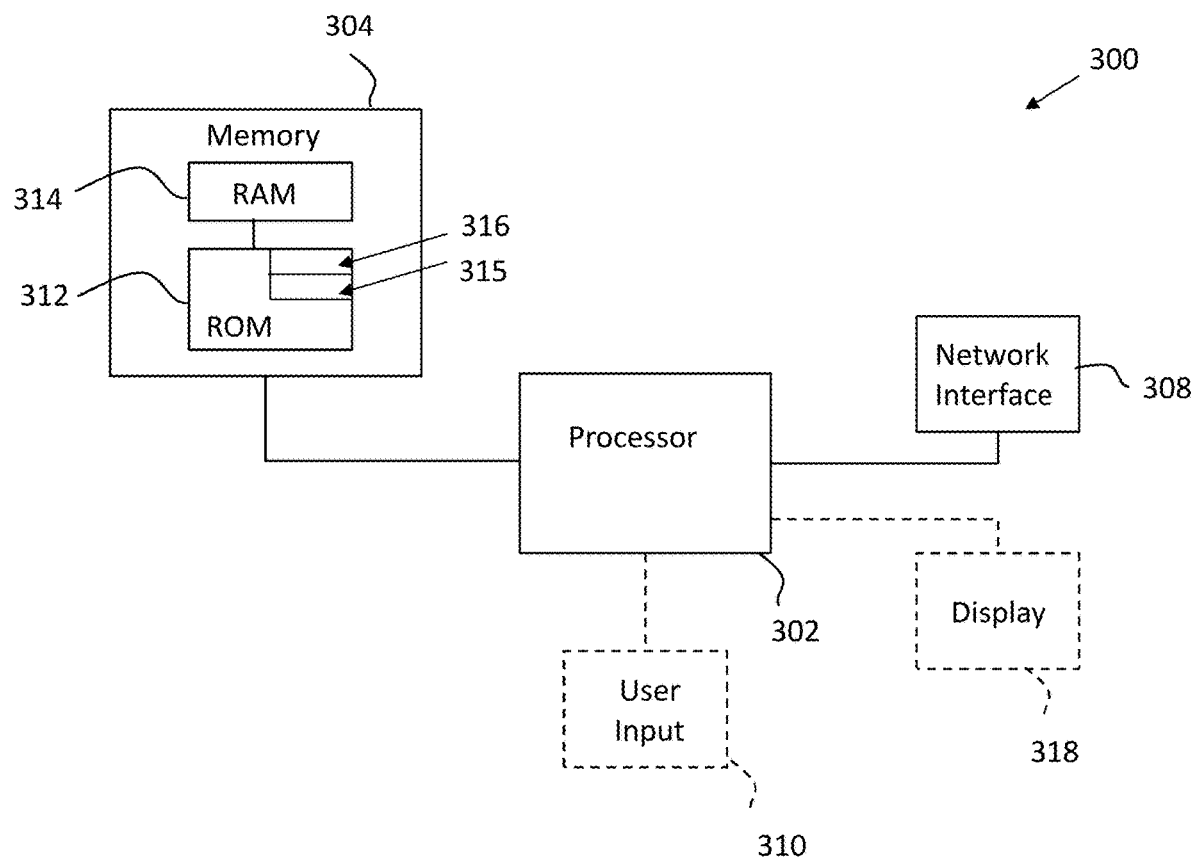
FIG. 12 is a block diagram of components of a system in accordance with an example embodiment.

For completeness, FIG. 12 is a schematic diagram of components of one or more of the example embodiments described previously, which hereafter are referred to generically as a processing system 300. The processing system 300 may, for example, be (or may include) the apparatus referred to in the claims below.

The processing system 300 may have a processor 302, a memory 304 coupled to the processor and comprised of a random access memory (RAM) 314 and a read only memory (ROM) 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the methods and algorithms 50, 70 and 110 and the message sequence 80 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 13:
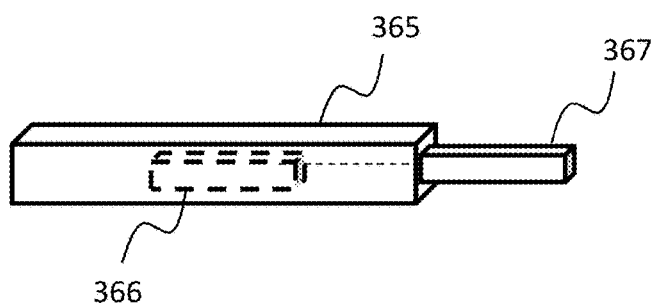
FIG. 13 shows an example of tangible media for storing computer-readable code which when run by a computer may perform methods according to example embodiments described above.

FIG. 13 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequence of FIGS. 5, 7, 8 and a are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and
at least one memory storing instructions that, when executed by the at least one processor, cause the apparatus at least to perform:
sending a request from a transmitting user device to a second user device for communication resource recommendations based on a resource setting, wherein the communication resource recommendations include preferred and/or non-preferred communications resources for sidelink transmissions from the transmitting user device to a receiving user device and wherein the resource setting comprises a number of the preferred communication resources;
receiving the requested communication resource recommendations at the transmitting user device in accordance with the resource setting, wherein the communication resource recommendations are based on conditions as detected at the second user device; and
adjusting the resource setting, based, at least in part, on conditions as detected at the transmitting user device,
wherein the adjusting the resource setting comprises adjusting the number of the preferred communication resources based, at least in part, on overlap of the preferred or non-preferred communications resources of the transmitting user device with the received communication resource recommendations received from the second user device.

2. An apparatus as claimed in claim 1, wherein when executed by the at least one processor, the instructions cause the apparatus to perform adjusting the resource setting to adjust said resource setting based, at least in part, on the received communication resource recommendations.

3. An apparatus as claimed in claim 1, wherein when executed by the at least one processor, the instructions cause the apparatus to further perform:
determining whether to adjust said resource setting, based on conditions as detected at the transmitting user device and adjusting said resource setting accordingly.

4. An apparatus as claimed in claim 3, wherein when executed by the at least one processor, the instructions cause the apparatus to perform determining whether to adjust said resource setting by:
determining a probability that at least a defined number or percentage of said communication resource recommendations are not excluded by the transmitting user device and adjusting said resource setting based on the determined probability.

5. An apparatus as claimed in claim 3, wherein when executed by the at least one processor, the instructions cause the apparatus to perform determining whether to adjust said resource setting by:

determining a communication congestion metric; and
adjusting the resource setting based on said communication congestion metric.

6. An apparatus as claimed in claim 5, wherein said communication congestion metric is based, at least in part, on a channel busy ratio of said transmitting user device and/or the second user device.

7. An apparatus as claimed in claim 5, wherein said communication congestion metric is based, at least in part, on a degree of overlap between preferred resources of the second user device and non-preferred resources of the transmitting user device.

8. An apparatus as claimed in claim 1, wherein when executed by the least one processor, the instructions cause the apparatus to further perform:
selecting communication resources for transmissions from said transmitting user device to said receiving user device based, at least in part, on the communication resource recommendations received from said second user device.

9. An apparatus as claimed in claim 1, wherein the preferred and/or non-preferred communications resources for sidelink transmissions from the transmitting user device to a receiving user device are defined by one or more of:
time slot(s) for transmissions;
starting subchannels;
resource size; and
modulation and coding schemes.

10. A system comprising a transmitting user device and a second user device, wherein:
the transmitting user device comprises at least one processor; and
at least one memory storing instructions that, when executed by the at least one processor, cause the transmitting user device at least to perform:
sending a request to the second user device for communication resource recommendations based on a resource setting, wherein the communication resource recommendations include preferred and/or non-preferred communications resources for sidelink transmissions from the transmitting user device to a receiving user device, and wherein the resource setting comprises a number of the preferred communication resources;
receiving the request requested communication resource recommendations at the transmitting user device in accordance with the resource setting, wherein the communication resource recommendations are based on conditions as detected at the second user device; and
adjusting the resource setting, based, at least in part, on conditions as detected at the transmitting user device,
wherein the adjusting the resource setting comprises adjusting the number of the preferred communication resources based, at least in part, on overlap of the preferred or non-preferred communications resources of the transmitting user device with the received communication resource recommendations received from the second user device; and
the second user device configured to perform:
receiving the request from the transmitting user device for communication resource recommendations based on said resource setting;
generating the requested communication resource recommendations in accordance with the resource setting, based on conditions as detected at the receiving user device; and
sending the generated requested communication resource recommendations to the transmitting user device.

11. A system as claimed in claim 10, wherein the second user device is the receiving user device.

12. A system as claimed in claim 10, wherein the second user device is a neighbour of the receiving user device.

13. A method comprising:
sending a request from a transmitting user device to a second user device for communication resource recommendations based on a resource setting, wherein the communication resource recommendations include preferred and/or non-preferred communications resources for sidelink transmissions from the transmitting user device to a receiving user device, and wherein the resource setting comprises a number of the preferred communication resources;
receiving the requested communication resource recommendations at the transmitting user device in accordance with the resource setting, wherein the communication resource recommendations are based on conditions as detected at the second user device; and
adjusting the resource setting, based, at least in part, on conditions as detected at the transmitting user device,
wherein the adjusting the resource setting comprises adjusting the number of the preferred communication resources based, at least in part, on overlap of the preferred or non-preferred communications resources of the transmitting user device with the received communication resource recommendations received from the second user device.

14. A non-transitory computer readable medium comprising program instructions that, when executed by an apparatus, cause the apparatus to perform at least the following:
sending a request from a transmitting user device to a second user device for communication resource recommendations based on a resource setting, wherein the communication resource recommendations include preferred and/or non-preferred communications resources for sidelink transmissions from the transmitting user device to a receiving user device, and wherein the resource setting comprises a number of the preferred communication resources;
receiving the requested communication resource recommendations at the transmitting user device in accordance with the resource setting, wherein the communication resource recommendations are based on conditions as detected at the second user device; and
adjusting the resource setting, based, at least in part, on conditions as detected at the transmitting user device,
wherein the adjusting the resource setting comprises adjusting the number of the preferred communication resources based, at least in part, on overlap of the preferred or non-preferred communications resources of the transmitting user device with the received communication resource recommendations received from the second user device.

15. An apparatus as claimed in claim 1, wherein the second user device is the receiving user device.

16. An apparatus as claimed in claim 1, wherein the second user device is a neighbor of the receiving user device.

17. The apparatus as claimed in claim 1, wherein the apparatus is the transmitting user device.

\* \* \* \* \*